Patented Mar. 13, 1951

2,544,666

UNITED STATES PATENT OFFICE 2,544,666

WERNER-TYPE CHROMIUM COMPOUNDS AS LAMINATING AND COATING COMPOSITIONS

Max T. Goebel, Rocky River, and Ralph K. Iler, Cleveland Heights, Ohio, assignors to E. I. du Pont de Nemours & Company, Wilmington, Del., a corporation of Delaware No Drawing. Application April 27, 1946, Serial No. 665,607

14 Claims. (Cl. 154—140)

1

The invention relates to novel compositions and processes for producing them, to processes employing these compositions for effecting chemical bonding between diverse materials, and to articles so bonded. More particularly, the invention is directed to complex compounds of the Werner type in which trivalent nuclear chromium atoms are coordinated with unsaturated carboxylic acido groups having less than ten carbon atoms, to processes for making these compositions comprising effecting contact, in solution, between unsaturated carboxylic acido groups having less than ten carbon atoms and basic trivalent chromium salts of monobasic acids, the basicity of the chromium salts being no greater than about fifty per cent, to processes in which chemical bonding is effected between diverse materials by bonding the chromium of such a chromi-nuclear complex to a material having a negatively charged surface and polymerizing a material capable of polymerizing through an ethylenic linkage in contact with an unsaturated acido group of the complex, whereby a chemical bond is formed between the complex and the polymer, and to the chemically bonded articles so produced.

The desirability of effecting improved bonding between diverse materials has been recognized in a variety of situations. It has been realized that composite structures made up of dissimilar materials could possess the advantageous properties of each of the constituent materials and at the same time have additional, especially desirable properties resulting from the combination, if only suitable ways of effecting permanent joining of the materials could be found. Thus, it was proposed to embed a mass of fibers, such as rayon cord, in a continous phase of a diverse material, rubber, to produce a structure having the strength of the fibers and the elasticity of the rubber and a combination of properties especially useful in tires. Unfortunately, rubber did not have as high a degree of affinity for rayon as was required, and the lack of bonding was an obstacle in the realization of the expected advantages.

When a material, such as a fiber, is embedded in another material, the latter may be said to adhere by mechanical bonding. The fiber may be squeezed so tightly that no movement at the interface will occur. However, if the fiber is a substance having a hydrophilic surface, and the embedded fiber structure is immersed in water in such a way that contact between the fiber and water is possible, the water may be found to penetrate the mechanical bond and loosen it, so that the strength of the bond falls off rapidly. In this manner composite structures which have excellent dry strength are rendered unsuitable for purposes where wetting is likely to occur, such as in outdoor exposure.

The present invention is concerned with chemical bonds, in contradistinction to the mechanical bonds above described, and to such bonds which are resistant to the action of water.

Now according to the present invention it has been found that by processes in which contact, in solution, is effected between unsaturated carboxylic acido groups having less than ten carbon atoms and basic trivalent chromium salts of monobasic acids, the basicity of the chromium salts being no greater than about fifty per cent, there may be produced novel complex compounds of the Werner type and that by bonding the chromium of such a chromi-nuclear complex to a material having a negatively charged surface and polymerizing a material capable of polymerizing through an ethylenic linkage in contact with an unsaturated acido group of the complex, chemical bonding may be effected between diverse materials with the production of bonded structures having improved properties.

The novel chromium complex compounds of this invention are coordination compounds of the Werner type and are not to be confused with the normal chromium salts. Thus, a composition in which the carboxylic acido groups are coordinated with the chromium differs radically in chemical properties from a composition in which the acido groups are held only by primary valence bonds such as ionic bonds. Such observed differences in properties may be explained on the basis of structure rather than empirical composition, the Werner's theory of complex compounds affords a convenient and logical basis for such an explanation.

According to the Werner theory, atoms may exert auxiliary valences as well as the principal valences occurring in simple compounds. These auxiliary valences may act to hold various groups to the atom exerting them, and the atom exerting the principal and auxiliary valences may become the nuclear atom of a complex compound or complex ion.

With particular reference to chromium it has been found that the total number of groups which may be held within the complex by the combined principal and auxiliary valences is six. The groups so held are referred to as "coordinated groups" and chromium is said to have a "coordination number" of six. Other groups may also be associated with the chromium, but when this is the case such additional groups are present as ions and are outside of the chromi-nuclear complex. Moreover, there may be more than one chromi-nuclear atom within the complex, the chromium atoms being linked together by reason of being coordinated thru common groups known as bridging groups. With respect to each chromium atom, each bridging group occupies but a single coordination position, so that an additional five coordination groups may be present on the atom.

In accordance with the above-stated Werner theory, the compositions of this invention may be described as Werner complex compounds characterized by having therein associated with a trivalent nuclear chromium atom an unsaturated carboxylic acido group having less than ten carbon atoms. Such acido groups, which for convenience of reference will hereinafter be designated as "functional" acido groups, may be present as simple coordinated groups held by either principal or auxiliary valences, or they may be present as bridging groups between two nuclear chromium atoms. Particular acido groups may conveniently be designated by adding the suffix "ato" to the first part of the name of the carboxylic acid corresponding to the acido group. For instance, acrylic acid gives "acrylato" groups, crotonic acid gives "crotonato" groups, and sorbic acid gives "sorbato" groups.

The fact that the functional acido groups are inside, rather than outside, the coordination spheres of the chromium atoms probably accounts for the unusual chemical properties of the compositions such as the fact that they are soluble in water and are adsorbed on negatively charged surfaces from aqueous solutions. It will be understood that there may be more than one chromium atom within the complex and that the chromium atoms may be held together by bridging groups other than acido groups, so that for each functional acido group there may be several nuclear chromium atoms within the complex, it being necessary only that within the complex there is at least one nuclear trivalent chromium atom coordinated with a functional acido group. Preferably, however, the number of chromium atoms per unsaturated carboxylic acido group having less than ten carbon atoms will not be more than about ten.

The functional acido group coordinated with the nuclear chromium atom in a composition of this invention should be unsaturated. The term "unsaturated" is here used in its ordinary chemical meaning to indicate a carbon-to-carbon multiple bond such as is found, for instance, in ethylene or acetylene. It does not include the aromatic type of linkage found in the benzene ring, but it does include ring unsaturation such as found in the furyl ring of beta furyl acrylic acid. Generically, compounds which possess a "bromine" or "iodine number" by reason of a multiple carbon-to-carbon bond are comprehended by the term "unsaturated" as here used.

The functional acido group may contain a single unsaturated group, as in acrylic acid, or a plurality of such groups, as in sorbic acid. The group may contain a double bond, as in crotonic acid, or a triple bond, as in propiolic acid. The unsaturated monocarboxylic acids are especially effective. This group includes beta, gamma unsaturated acids such as vinyl acetic and gamma, delta unsaturated acids such as allyl acetic, but of this group the alpha-beta unsaturated acids are especially preferred. Members of this class include, for instance, acrylic acid and substituted acrylic acids such as crotonic, isocrotonic, alpha and beta ethyl acrylic, angelic, and tiglic, and beta furyl acrylic acids, all of which are hereinafter referred to generically as acrylic acids.

In a composition of this invention the ratio of nuclear trivalent chromium atoms per functional acido group within the complex preferably should be from 1:1 to about 10:1. When two or more nuclear chromium atoms are coordinated with a single acido group within the complex, the chromium atoms may be coordinated with each other thru bridging groups. Various groups may function in this bridging capacity, examples, for instance, being hydroxyl (OH), aquo (H₂O), and acido groups, either functional or non-functional.

The groups, other than the functional acido groups, with which chromium atoms are coordinated in the compositions of this invention are of secondary importance only. These groups preferably should be, from the standpoint of valence, either neutral or monovalent. The neutral groups are of course held by auxiliary valence bonds, aquo groups (H₂O) being a typical example. The monovalent groups are negative and are typified by such groups as chloro, bromo, formato, acetato and nitrato groups. It will be observed that groups of this type are characteristic of the anions of monobasic acids and that chromium compounds containing them are salts of monobasic acids.

Acido groups which are not coordinated with the chromium may, of course, be present. Such groups may be ionizable and may even ionize to give ions of the same acid which is coordinated with the chromium. For instance, in a crotonato chromic chloride there may be present, in addition to the coordinated crotonato group, anions of crotonic acid which can ionize off to give crotonate ions. Similarly, such uncoordinated groups may be anions of inorganic monobasic acids such as hydrochloric acid.

The method of making a novel composition of this invention may be generically described as effecting contact in solution between unsaturated carboxylic acido groups having less than 10 carbon atoms and basic trivalent chromium salts of monobasic acids, the basicity of the chromium salts being no greater than about 50%. The process may be varied considerably as to details depending upon the particular composition which it is desired to produce.

The solvent used may be any substance capable of dissolving the reactants or holding them in solution. Inert solvents such as chlorinated hydrocarbons, and especially carbon tetrachloride, are satisfactory. Water may also be used, although in this case it will generally be desirable to work in as concentrated a solution as possible.

The acido groups taking part in the reaction may be derived from suitable acids which have already been described above. The functional acido groups may also be derived from salts or esters containing acido groups. For instance, the presence of sorbato groups may be effected by hydrolysis of methyl sorbate, or by acidification of the sodium salt of sorbic acid. It will be understood, of course, that the acido group is not present alone in any case but that the manner in which it is associated in the solution initially is relatively unimportant so long as a dissociation can occur to give the acido group.

The presence in the reaction mixture of a basic trivalent chromium salt of a monobasic acid may be effected in a variety of ways. One way is to add the previously prepared basic salt. For instance, basic chromic nitrate, $$Cr(OH)(NO_3)_2 \cdot 5H_2O$$

may be added in this manner. Another way is to heat a trivalent chromium salt such as chromic chloride hexahydrate $CrCl_3 \cdot 6H_2O$, in the reaction mixture, whereby a rearrangement and dehydration of the chromic chloride takes place with the formation of a basic salt.

A particularly preferred practice is to form the basic chromium salt in the reaction mixture by reducing a hexavalent chromium compound. Thus, chromyl chloride or chromic oxide ($CrO_3$) may be reduced with an agent such as an alcohol. The alcohol in such case may act also as a solvent for the reaction mixture.

The method of making the basic chromium salt by reducing hexavalent chromium compound is particularly preferred, but certain precautions should be observed. Basic trivalent chromium salts have marked tendency to coordinate with hydroxyl groups, and, by reason of two chromium atoms coordinating with a single hydroxyl group, to form compounds of high molecular weight, this process being known as "olation." As olation takes place, compositions of high molecular weight are formed which are insoluble or only sparingly soluble in water. To minimize such olation it is ordinarily desirable to use the basic trivalent chromium salt immediately after its preparation. On the other hand it is also desirable to have the unsaturated acido group present only after the chromium is substantially in the trivalent state. Thus in a preferred process the acido group is added immediately after the reduction has taken place.

As a reducing agent it has been found particularly advantageous to use alcohols and especially secondary alcohols.

The basic chromic salt should be a salt of a monobasic acid, that is, an acid having a single ionizable hydrogen. The acid may be organic such as acetic or propionic, or it may be inorganic, such as hydrochloric, nitric, or hydrobromic acid.

The basicity of the chromic salt should be not greater than 50%. The percentage of basicity of the salt may be defined as a measure of the extent to which hydroxyl ions have replaced the anions of the monobasic acid in the chromic salt. For instance, chromic chloride hexahydrate, $CrCl_3 \cdot 6H_2O$, is a chromic salt of the monobasic acid, hydrogen chloride, having 0% basicity. When the hydroxyl group replaces one of the chlorine atoms a basic salt,

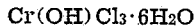

$Cr(OH)Cl_2 \cdot 6H_2O$ is formed, and since one-third of the anionic groups of the monobasic acid has been replaced, this composition is said to be 33⅓% basic. Similarly, if two of the chlorine atoms had been replaced, the compound would be 66⅔% basic. In the present process the basicity of the chromium salt should not exceed about 50% regardless of whether the salt is added as such or is formed in situ by the reduction of a hexavalent chromium compound. So long as there is any basicity the Werner complex compounds will form, so that the basicity may be only a fraction of 1% if desired.

Having prepared a Werner-type complex compound by such a method as is above-described, one may, according to this invention, employ the composition for chemically bonding diverse materials by processes in which the chromium of the chromi-nuclear complex is bonded to a material having a negatively charged surface and a material capable of polymerizing through an ethylenic linkage is polymerized in contact with a functional acido group of the complex.

In any bond between two surfaces there are two distinct types of molecular forces involved. The first are physical or Van der Waal's forces commonly having an energy of the order of 2,000 to 10,000 calories per molecule. The second type are chemical or covalent bonds, having an energy of from 10,000 to 200,000. It is the chemical, rather than the physical, type of adhesive bonds with which this invention is concerned.

It will be understood that in any process for adhesively joining two or more materials the materials being joined are essentialy in the solid state. For purposes of the present discussion it will be considered that plastic materials, which will flow under definite stress, are essentially in the solid state.

When two solid materials are adhesively joined their surfaces are brought into as close proximity as possible. Where both materials are rigid, almost invariably there is a lack of conformity of the surfaces to each other, so that an intermediate adhesive layer must be employed which is sufficiently fluid to fill the irregularities in the solid surfaces and thereby establish substantial conformity between the surfaces. The mere ability thus to provide a substantially continuous interface between materials to be adhesively joined is not in itself sufficient to make a substance a good adhesive. In addition, the adhesive must have a definite affinity for the surfaces being joined. Where diverse materials, that is, materials having different chemical or physical natures are being joined a special problem is presented because an adhesive having an affinity for one of the materials may have no affinity for the other. This problem has been solved by the present invention according to which it has been been found advantageous to treat the unbonded solid surface with a material of duel chemical structure such that one part of the structure will react with the solid surface, and the other part with the adhesive, thus creating a chemical bond. Such intermediate reagent of dual chemical functionality for purposes of the present description, is referred to as a "bonding agent."

It will be apparent that the need for a bonding agent may occur, not only in cases where solids are to be jonied by adhesive but also in cases where a plastic coating is to be applied to a solid surface. The plastic coating may of course be applied as a liquid which subsequently is hardened to a solid. The coatings may be quite thin, as a paint or varnish film, or relatively thick, as in the case of rubber-coated objects. The bonding agent may be applied, not only where a thin adhesive layer is used between two solid surfaces, but also where solid fibers such as glass or cords of textiles such as rayon are embedded and thus held in an assembly in a plastic medium such as rubber.

One of the two diverse materials which may be bonded according to a process of this invention is a material having a negatively charged surface. Such materials are characterized by containing a substantial proportion, that is, above about 5%, of an element selected from the group consisting of oxygen and nitrogen. These elements may be present in highly polar groups such as, for instance, OH, $NH_2$, —COC—, —NH—, C—O, COOH, and $SO_3H$. Thus, there are included as materials having negatively charged surfaces ceramic materials, vitreous masses, glass, cellulose (such forms as wood, paper, cotton, hemp, cellophane, rayon and cellulose acetate), and polyamide materials, in such forms as wool, silk, gelatin, synthetic protein fibers, leather, and hides. Also included are solid materials bearing oxide or hydroxide film such as may occur on metals.

As the other of the materials which may be bonded there is used a material capable of polymerizing through an ethylenic linkage. Such materials are characterized by being organic substances containing unsaturated carbon-to-carbon bonds. Included are synthetic organic monomers capable of polymerizing to form polymers of high molecular weight and also natural unsaturated substances such as gums and natural resins. Of the synthetic materials, particularly advantageous results are obtained using compounds of the methacrylate type, such as methyl methacrylate.

The bonding operation is carried out by forming a film or layer of the Werner-type chromium complex compound at the interface between the surfaces of the diverse materials being joined and effecting polymerization of the material capable of polymerizing through an ethylenic linkage in contact with a functional acido group of the complex. The material to be polymerized may be applied as the monomer or as a partially polymerized monomer. The polymerization may be assisted by applying heat and by the presence of polymerization catalysts. The tenacity of the union between the functional acido group of the complex and the polymerized material suggests that interpolymerization occurs between the acido group and the material polymerized, but applicants do not limit their invention to this explanation of the mechanism of the reaction.

The nature of this invention and its manner of application will be better understood by reference to the following illustrative examples.

*Example I*

A composition of this invention, crotonato chromic chloride, was prepared in the following manner:

A solution of a basic trivalent chromium salt having a basicity of 33⅓% was made up by reducing the hexavalent chromium compound, chromic oxide ($CrO_3$), using isopropanol as the reducing agent. Thus, a solution of 33.6 parts by weight of chromic oxide in 66.4 parts of 36% hydrochloric acid was slowly added to a refluxing solution of 5.4 parts of hydrochloric acid in 94.6 parts of isopropanol. Analysis of the resulting solution showed 8.35% chloride and 7.43% chromium. The Cl/Cr ratio was adjusted to 2:1 by the addition of 4.92 parts of hydrochloric acid.

Coordination of crotonato groups with this basic trivalent chromium salt was effected by adding 4.97 parts of crotonic acid and 9.26 parts of isopropanol to 85.76 parts of the basic chromic solution. The isopropanol acted as a solvent in this step of the reaction. The solution was heated to reflux and allowed to cool. The product thus obtained, crotonato chromic chloride, contained 6% chromium and was soluble in water.

The composition was used as a chemical bonding agent by dipping a sheet of glass into an aqueous solution of the crotonato chromic chloride, allowing the glass to dry, superimposing upon the glass a mass of a methacrylate monomer, and heating the monomer in the presence of benzoyl peroxide as a catalyst to effect polymerization.

It was found that by the foregoing process the glass was firmly bonded to the methacrylate polymer and that the bonds so formed did not deteriorate even upon long exposure of the structure to water. By contrast a structure prepared by joining an untreated sheet of glass to methacrylate polymers according to an otherwise identical process loosened up after 80 hours of exposure to water.

*Example II*

A composition of this invention containing an acido group in which the unsaturation is part of a ring structure was prepared in the following manner:

To 85.76 parts by weight of a basic trivalent chromium solution prepared as in Example I there was added 6.52 parts of furoic acid and 7.72 parts of isopropanol. The solution was heated to reflux and was then allowed to cool. There was obtained as a product a solution of furoato chromic chloride which was found to be water-soluble.

*Example III*

Another composition of this invention, sorbato chromic chloride, was prepared by adding to 87.7 parts of a basic trivalent chromium solution containing 6.85% chromium and prepared as in Example I, 6.5 parts of sorbic acid and 5.8 parts of isopropanol, and heating the mixture under reflux. A water-soluble product was obtained which was found to be effective for forming chemical bonds between glass fibers and methacrylate resins as described in Example I.

*Example IV*

The preparation of a composition of this invention in which the coordinating acido group was derived from a half ester was carried out as follows:

To 82.7 parts by weight of isopropanol there was added 17.3 parts of maleic anhydride. The solution was refluxed for 8 hours by heating and was then added to 73.3 parts of a basic chromium solution containing 6.85% chromium and prepared as described in Example I. The product was concentrated by distilling off 19.25 parts by weight of isopropanol to give a resulting product containing 6% chromium. This product was found to be soluble in water and was found to be useful for treating glass fibers for effecting chemical bonding thereto of polymers capable of polymerizing through ethylenic linkages.

*Example V*

The preparation of a composition of this invention containing as the coordinated functional acido groups beta-furyl acrylato groups derived from beta-furyl acrylic acid was carried out as follows:

A solution of a basic trivalent chromium salt was prepared by dissolving in one liter of ethyl alcohol sufficient chromic chloride hexahydrate, $CrCl_3 \cdot 6H_2O$, to give a 0.25 molar solution.

A one molar solution of beta-furyl acrylic acid was prepared by dissolving 30.6 grams of the acid in 200 cc. of ethyl alcohol. To 400 cc. of the chromic chloride solution there was added 50 cc. of the acid solution and 50 cc. of ethyl alcohol.

The solutions were mixed and there was then added 100 cc. of 0.1 molar sodium hydroxide ethyl alcohol solution. The mixture was then heated under reflux. After 45 minutes' heating, sodium chloride precipitated out and was filtered off. A clear green filtrate was obtained which was then evaporated down to 150 cc. and additional salt which precipitated was filtered out. The product obtained was soluble in water.

The product obtained as described above was used as a chemical bonding agent in the following manner:

Rayon tire cords were dipped in an aqueous solution of the chromium compound, allowed to dry, and were then embedded in a mass of uncured rubber. The rubber was then subjected to a conventional curing treatment and vulcanization. It was found that a substantial improvement in the adherence of the cord to the rubber was obtained in comparison to untreated rayon cords in the same rubber following the same treatment.

We claim:

1. A complex compound of the Werner type consisting of a monocarboxylic functional acido group made up of a carboxyl radical joined to an alpha,beta-unsaturated carbon chain containing from two to six carbon atoms, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

2. A complex compound of the Werner type consisting of an acrylic functional acido group made up of a carboxyl radical joined to an alpha, beta-unsaturated carbon chain containing from two to six carbon atoms, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

3. A complex compound of the Werner type consisting of a monocarboxylic functional acido group made up of a carboxyl radical joined to an alpha, beta-unsaturated carbon chain containing from two to six carbon atoms, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being about two times the number of coordinated functional acido groups.

4. A complex compound of the Werner type consisting of an acrylic functional acido group made up of a carboxyl radical joined to an alpha, beta-unsaturated carbon chain containing from two to six carbon atoms, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being about two times the number of coordinated functional acido groups.

5. In a process for producing a Werner-type complex compound in which a monocarboxylic, unsaturated acido group is coordinated through the carboxyl with a nuclear trivalent chromium atom, the step comprising effecting contact, in solution, between a monocarboxylic acid in which the carboxyl is joined to an alpha, beta-unsaturated carbon chain containing from two to six carbon atoms, and a basic, trivalent chromium salt of a monobasic acid, the basicity of the chromium salt being no greater than about fifty per cent and the mole proportion of chromium to monocarboxylic acid being from 1:1 to 10:1.

6. In a process for producing a Werner-type complex compound in which an acrylic acido group is coordinated through the carboxyl with a nuclear trivalent chromium atom, the step comprising effecting contact, in solution, between an acrylic acid in which the carboxyl is joined to an alpha, beta-unsaturated carbon chain containing from two to six carbon atoms, and a basic, trivalent chromium salt of a monobasic acid, the basicity of the chromium salt being no greater than about fifty per cent and the mole proportion of chromium to monocarboxylic acid being from 1:1 to 10:1.

7. In a process for producing a Werner-type complex compound in which a monocarboxylic, unsaturated acido group is coordinated through the carboxyl with a nuclear trivalent chromium atom, the step comprising effecting contact, in solution, between a monocarboxylic acid in which the carboxyl is joined to an alpha, beta-unsaturated carbon chain containing from two to six carbon atoms, and a basic, trivalent chromium salt of a monobasic acid, the basicity of the chromium salt being no greater than about fifty per cent and the mole proportion of chromium to monocarboxylic acid being about 2:1.

8. In a process for producing a Werner-type complex compound in which an acrylic acido group is coordinated through the carboxyl with a nuclear trivalent chromium atom, the step comprising effecting contact, in solution, between an acrylic acid in which the carboxyl is joined to an alpha, beta-unsaturated carbon chain containing from two to six carbon atoms, and a basic, trivalent chromium salt of a monobasic acid, the basicity of the chromium salt being no greater than about fifty per cent and the mole proportion of chromium to monocarboxylic acid being about 2:1.

9. In a process for producing a Werner-type complex compound in which an acrylic acido group is coordinated through the carboxyl with a nuclear trivalent chromium atom, the step comprising effecting contact, in solution, between an acrylic acid in which the carboxyl is joined to an alpha, beta-unsaturated carbon chain containing from two to six carbon atoms, and a basic, trivalent chromium salt of hydrochloric acid, the basicity of the chromium salt being no greater than about fifty per cent and the mole proportion of chromium to monocarboxylic acid being about 2:1.

10. An article wherein there is a material containing on its surface above about 5% of an element having an atomic weight of from 14 to 16, inclusive, the material being coated with an ethylenic polymer and a complex compound of the Werner type consisting of a monocarboxylic functional acido group made up of a carboxyl radical joined to an alpha, beta-unsaturated carbon chain containing from two to six carbon atoms, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

11. An article wherein there is a material containing on its surface above about 5% of an element having an atomic weight of from 14 to 16, inclusive, the material being selected from the group consisting of vitreous, cellulosic and polyamide materials and metals bearing an oxygen-containing film, and being coated with an ethylenic polymer and a complex compound of the Werner type consisting of a monocarboxylic functional acido group made up of a carboxyl radical joined to an alpha, beta-unsaturated carbon chain containing from two to six carbon atoms, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

12. A laminated article with laminae of a material containing on its surface above about 5% of an element having an atomic weight of from 14 to 16, inclusive, the laminae being bonded with an ethylenic polymer and a complex compound of the Werner type consisting of a monocarboxylic functional acido group made up of a carboxyl radical joined to an alpha, beta-unsaturated carbon chain containing from two to six carbon atoms, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acid groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

13. A laminated article with laminae of a material containing on its surface above about 5% of an element having an atomic weight of from 14 to 16, the material being selected from the group consisting of vitreous, cellulosic and polyamide materials and metals bearing an oxygen-containing film, the laminae being bonded with an ethylenic polymer and a complex compound of the Werner type consisting of a monocarboxylic functional acido group made up of a carboxyl radical joined to an alpha, beta-unsaturated carbon chain containing from two to six carbon atoms, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

14. A laminated article with laminae of glass bonded with an ethylenic polymer and a complex compound of the Werner type consisting of an acrylic functional acido group made up of a carboxyl radical joined to an alpha, beta-unsaturated carbon chain containing from two to six carbon atoms, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being about two times the number of coordinated functional acido groups.

MAX T. GOEBEL.
RALPH K. ILER.

REFERENCES CITED

The following references are of record in the file of this patent:

UNITED STATES PATENTS

| Number | Name | Date |
|---|---|---|
| 2,271,228 | Nadeau et al. | Jan. 27, 1940 |
| 2,273,040 | Iler | Feb. 17, 1942 |
| 2,334,358 | Smith | Nov. 16, 1943 |
| 2,356,161 | Iler | Aug. 22, 1944 |
| 2,381,752 | Iler | Aug. 7, 1945 |

OTHER REFERENCES

Duff: "Jour. Chem. Soc. (London)," vol 119 (1921), pages 385–390.

Weinland et al.: "Ber. deutsch Chem. Ges.," vol. 46 (1913), pages 3144–3150.

Brintziger et al.: "Zeit. Anorg. Allg. Chem.," vol. 235 (1937), pages 126–128.